US012776898B2

(12) United States Patent
Koehler-Sidki et al.

(10) Patent No.: US 12,776,898 B2
(45) Date of Patent: Oct. 27, 2026

(54) WAVELENGTH MULTIPLEXING FOR AN OPTICAL COMMUNICATION SYSTEM

(71) Applicant: Arqit Limited, London (GB)

(72) Inventors: Alexander Koehler-Sidki, Cambridgeshire (GB); Ryan Parker, Essex (GB); Omar Iqbal, Hampshire (GB)

(73) Assignee: Arqit Limited, London (GB)

( * ) Notice: Subject to any disclaimer, the term of this patent is extended or adjusted under 35 U.S.C. 154(b) by 34 days.

(21) Appl. No.: 18/702,240

(22) PCT Filed: Sep. 28, 2022

(86) PCT No.: PCT/GB2022/052455
§ 371 (c)(1),
(2) Date: Apr. 17, 2024

(87) PCT Pub. No.: WO2023/067297
PCT Pub. Date: Apr. 27, 2023

(65) Prior Publication Data
US 2024/0348432 A1 Oct. 17, 2024

(30) Foreign Application Priority Data
Oct. 18, 2021 (GB) ..................................... 2114873

(51) Int. Cl.
*H04L 9/08* (2006.01)
*H04J 14/02* (2006.01)

(52) U.S. Cl.
CPC ........ *H04L 9/0852* (2013.01); *H04J 14/0305* (2023.08)

(58) Field of Classification Search
CPC ........................... H04L 9/0852; H04J 14/0305
(Continued)

(56) References Cited

U.S. PATENT DOCUMENTS 7,929,700 B2 * 4/2011 Lodewyck ............ H04L 9/0858 380/256
9,071,425 B2 * 6/2015 Yuan ...................... H04B 10/70
(Continued)

FOREIGN PATENT DOCUMENTS

EP 3402093 11/2018
GB 2534917 A * 8/2016 ............ H04B 10/70
(Continued)

OTHER PUBLICATIONS

Merriam-Webster, "channel" n. 1d, 2026, available at https://www.merriam-webster.com/dictionary/channel (Year: 2026).*
(Continued)

*Primary Examiner* — David P Zarka
(74) *Attorney, Agent, or Firm* — Dentons US LLP

(57) ABSTRACT

A system and method including at a transmitter emitting N single-wavelength quantum beams from N faint photon sources; multiplexing the N single-wavelength quantum beams using a first wavelength division multiplexer (WDM) to produce a combined multi-wavelength quantum beam, wherein the combined multi-wavelength quantum beam comprises a series of interleaved single-photon events having different wavelengths, and has a repetition rate N times that of individual single-wavelength quantum beams; transmitting the combined multi-wavelength quantum beam to a receiver; and at the receiver: de-multiplexing the combined multi-wavelength quantum beam according to the wavelength using a second WDM to recover the N single-wavelength quantum beams; at N single photon detection units, receiving a respective quantum beam of the N quantum beams and detecting single photon events from the respective quantum beam, such that each single photon detection unit corresponds to a respective quantum beam
(Continued)

and as such the respective wavelength of that quantum beam.

18 Claims, 4 Drawing Sheets

(58) Field of Classification Search
USPC .......................................................... 380/256
See application file for complete search history.

(56) References Cited

U.S. PATENT DOCUMENTS

| | | | | |
|---|---|---|---|---|
| 10,158,481 | B2 * | 12/2018 | Bunandar | H04L 9/0852 |
| 11,804,908 | B2 * | 10/2023 | Kaliteevskiy | H04B 10/70 |
| 2005/0135627 | A1 * | 6/2005 | Zavriyev | H04L 9/0852 380/278 |
| 2006/0023885 | A1 * | 2/2006 | Trifonov | H04B 10/70 380/256 |
| 2009/0185689 | A1 * | 7/2009 | Beal | H04L 9/0858 380/278 |
| 2012/0328290 | A1 * | 12/2012 | Yuan | H04L 9/0855 398/154 |
| 2017/0280211 | A1 * | 9/2017 | Damaghi | H04B 7/18517 |
| 2019/0013878 | A1 * | 1/2019 | Paraiso | H04L 9/0852 |

FOREIGN PATENT DOCUMENTS

| | | | |
|---|---|---|---|
| WO | 2006026004 | 3/2006 | |
| WO | WO-2006026004 A2 * | 3/2006 | H04B 10/70 |
| WO | 2020197575 | 10/2020 | |

OTHER PUBLICATIONS

Search Report from GB2114873.9, dated Mar. 28, 2023.

Alan Mink et al., “Programmable instrumentation and gigahertz signaling for single-photon quantum communication systems,” New Journal of Physics, Institute of Physics Publishing, Bristol, GB, vol. 11, No. 4, Apr. 1, 2009, p. 45016.

Takenaka Hideki et al., “Satellite-to-ground quantum-limited communication using a 50-kg-class microsatellite,” Nature Photonics, vol. 11, No. 8, Aug. 1, 2017, pp. 502-508.

Wengerowsky Soren et al., “An entanglement-based wavelength-multiplexed quantum communication network,” Nature, Nature Publishing Group UK, London, vol. 564, No. 7735, Dec. 12, 2018, pp. 225-228.

* cited by examiner

WAVELENGTH MULTIPLEXING FOR AN OPTICAL COMMUNICATION SYSTEM

This application is the National Stage filing under 35 U.S.C. 371 of International Application No. PCT/GB2022/052455, filed Sep. 28, 2022, claims the benefit of GB Application No. 2114873.9, filed Oct. 18, 2021, the contents of which are all hereby incorporated by reference herein in their entirety.

TECHNICAL FIELD

The present application relates to a method, system and software for operating an optical communication system, and in particular a quantum key distribution (QKD) system.

BACKGROUND

Cryptography is used to protect communications and transactions every day from, without limitation, for example Transport Layer Security (TLS) security for online shopping and banking to ultra-secure government communications. These transactions rely on reliable and secure means for at least two or more transacting parties to share a secret key, enabling encryption of data by one party and subsequent decryption by other parties.

It is expected that when commercially usable universal quantum computers (QC) become available, a variety of types of transactions, tasks and applications including, without limitation, conventional key distribution processes will be vulnerable. QCs can potentially crack many classical cryptography codes almost effortlessly. Conventional key distribution processes are not quantum secure by their nature of operation, as they are exposed to both quantum electronic and/or physical compromise.

It has been proposed to use quantum key distribution (QKD) to allow two distant parties to share a key in an information theoretic secure way that is guaranteed by the laws of physics. Significant progress has been carried out in recent years on implementing this over fibre. However, the loss experienced over terrestrial links severely limits the achievable distance. By utilising the negligible loss experienced by photons travelling through most of the atmosphere, satellite based QKD can overcome these limitations and enable inter-continental QKD.

Single photon avalanche photodiodes (SPADs) are often the detector of choice for QKD due to their affordability, small footprint and ability to operate at temperatures easily reachable by thermoelectric cooling (or room temperature). However, there are problems in using SPADs at high QKD repetition rates because SPADs suffer from finite timing resolution/jitter, which also manifests itself in long detector response 'tails'. The poor timing resolution of SPADs generally precludes operation at high QKD repetition rates due to the increased probability of detection events being registered at incorrect times, thus contributing to unworkably large error rates.

The embodiments described below are not limited to implementations which solve any or all of the problems of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

In a first aspect, the present disclosure provides an optical communication system comprising: a transmitter, wherein the transmitter comprises: N faint photon sources, where N is greater than 1, wherein each faint photon source is configured to emit a quantum beam at a different wavelength, and wherein each quantum beam comprises a series of single photon events; and a wavelength division multiplexer for multiplexing the quantum beams to produce a combined multi-wavelength quantum beam, wherein the combined multi-wavelength quantum beam comprises a series of interleaved single photon events having different wavelengths, and wherein the repetition rate of the combined quantum beam is N times the repetition rate of the individual quantum beams; and a receiver arranged to receive the combined multi-wavelength quantum beam from the transmitter, wherein the receiver comprises: a wavelength division demultiplexer for de-multiplexing the received combined multi-wavelength quantum beam to produce N quantum beams each with a different respective wavelength, wherein the repetition rate of each quantum beam is 1/N times the repetition rate of the combined multi-wavelength quantum beam, and wherein each quantum beam comprises a series of single photons; N single photon detection units, each configured to receive a respective quantum beam of the N quantum beams and detect single photon events resulting from the respective quantum beam, such that each single photon detection unit corresponds to a respective quantum beam and as such the respective wavelength of that quantum beam; one or more time-taggers configured to tag a detection event according to time, and at least one of: a wavelength of photons associated with the detection event, and an identity of the detecting single photon detection unit responsible for the detection event, thereby introducing a correlation between the time at which the detection event is registered, and at least one of: the wavelength of the photons associated with the detection event, and the identity of the detecting single photon detection unit responsible for the detection event; and a processing computer connected to the one or more time taggers, wherein the processing computer is configured to assign a detection time-period based on the correlation.

Preferably, the N single photon detection units, are arranged in parallel, for detecting single photon events resulting from each quantum beam, and wherein the demultiplexer directs each quantum beam to a separate single photon detection unit, thereby introducing a correlation between the identity of the detecting single photon detection unit and the wavelength of the photons. The one or more time-taggers are configured to tag the detection events according to time, and at least one of the wavelength of the photons, and the identity of the detecting single photon detection unit, thereby introducing a correlation between a time period in which a detection event is to be registered, and at least one of the wavelength of the photons and the identity of the detecting single photon detection units. The processing computer is connected to the one or more time taggers, wherein the processing computer is configured to use the correlation to verify whether or not a detection event has been tagged in the correct time period, and if a detection event is found to be tagged in the incorrect time period, re-assign the detection event to the correct time period.

In a second aspect, the present disclosure provides a transmitter for an optical communication system, the transmitter comprising: N faint photon sources, where N is greater than 1, wherein each faint photon source is configured to emit a quantum beam at a different wavelength, and wherein each quantum beam comprises a series of single photon events; and a wavelength division multiplexer for multiplexing the quantum beams to produce a combined multi-wavelength quantum beam, wherein the combined multi-wavelength quantum beam comprises a series of single photon events having different wavelengths, and wherein the repetition rate of the combined quantum beam is N times the repetition rate the individual quantum beams.

In a third aspect, the present disclosure provides a wavelength division demultiplexer for de-multiplexing a combined multi-wavelength quantum beam received from a transmitter to produce N quantum beams each with a different respective wavelength, wherein N is greater than 1, wherein the repetition rate of each quantum beam is 1/N times the repetition rate of the combined multi-wavelength quantum beam, and wherein each quantum beam comprises a series of single photons; N single photon detection units, each configured to receive a respective quantum beam of the N quantum beams and detect single photon events resulting from the respective quantum beam, such that each single photon detection unit corresponds to a respective quantum beam and as such the respective wavelength of that quantum beam; one or more time-taggers configured to tag a detection event according to time, and at least one of: a wavelength of photons associated with the detection event, and an identity of the detecting single photon detection unit responsible for the detection event, thereby introducing a correlation between the time at which the detection event is registered, and at least one of: the wavelength of the photons associated with the detection event, and the identity of the detecting single photon detection unit responsible for the detection event; and a processing computer connected to the one or more time taggers, wherein the processing computer is configured to assign a detection time-period based on the correlation.

Preferably the N single photon detection units are arranged in parallel, for detecting single photon events, and wherein the de-multiplexer directs each single-wavelength quantum beam to a separate single photon detection unit, thereby introducing a correlation between the identity of the detecting single photon detection unit and the wavelength of the photons; one or more time-taggers configured to tag the detection events according to time, and at least one of the wavelength of the photons, and the identity of the detecting single photon detection unit, thereby introducing a correlation between a time period in which a detection event is to be registered, and at least one of the wavelength of the photons and the identity of the detecting single photon detection units. The processing computer is connected to the one or more time taggers, wherein the processing computer is configured to use the correlation to verify whether or not a detection event has been tagged in the correct time period, and if a detection event is found to be tagged in the incorrect time period, re-assign the detection event to the correct time period.

In a fourth aspect, the present disclosure provides a method of operating an optical communication system, the method comprising: at a transmitter: emitting N single-wavelength quantum beams from N single faint photon sources; multiplexing N single-wavelength quantum beams using a first wavelength division multiplexer (WDM) to produce a combined multi-wavelength quantum beam, wherein the combined multi-wavelength quantum beam comprises a series of interleaved single-photon events having different wavelengths, and has a repetition rate N times that of individual single-wavelength quantum beams; transmitting the combined multi-wavelength quantum beam to a receiver; and at the receiver: de-multiplexing the combined multi-wavelength quantum beam according to the wavelength using a second WDM to recover the N single-wavelength quantum beams; at N single photon detection units, receiving a respective quantum beam of the N quantum beams and detecting single photon events resulting from the respective quantum beam, such that each single photon detection unit corresponds to a respective quantum beam and as such the respective wavelength of that quantum beam; tagging each single photon detection event resulting from each single-wavelength quantum beam according to time, and at least one of: a wavelength of photons associated with the detection event, and an identity of the detecting single photon detection unit responsible for the detection event, thereby introducing a correlation between the time at which the detection event is registered, and at least one of: the wavelength of the photons associated with the detection event, and the identity of the detecting single photon detection unit responsible for the detection event; and assigning a detection time-period to the detection event based on the correlation.

Preferably, at the receiver, the method includes: de-multiplexing the combined multi-wavelength quantum beam according to the wavelength using a second WDM to recover the N single-wavelength quantum beams; tagging each single photon detection event resulting from each single-wavelength quantum beam according to time period, wavelength of the photons, and the identity of the detecting single photon detection unit, thereby introducing a correlation between them; using this correlation to verify whether or not a single photon detection event has been tagged in the correct time period; and if a single photon detection event is found to be tagged in the incorrect time period, re-assigning the detection event to the correct time period.

In a fifth aspect, the present disclosure provides a method of operating a transmitter in an optical communication system, the method comprising: at a transmitter: emitting N single-wavelength quantum beams from N faint photon sources; multiplexing the N single-wavelength quantum beams using a wavelength division multiplexer to produce a combined multi-wavelength quantum beam, wherein the combined multi-wavelength quantum beam comprises a series of interleaved single-photon events having different wavelengths, and has a repetition rate N times that of individual single-wavelength quantum beams; and transmitting the combined multi-wavelength quantum beam to a receiver.

In a sixth aspect, the present disclosure provides a method of operating an optical communication system, the method comprising: receiving a combined multi-wavelength quantum beam from a transmitter, wherein the combined multi-wavelength quantum beam comprises a series of interleaved single photon events having different wavelengths; de-multiplexing the combined multi-wavelength quantum beam according to the wavelength using a WDM to recover N single-wavelength quantum beams, where N is a number greater than 1; at N single photon detection units, receiving a respective quantum beam of the N quantum beams and detecting single photon events resulting from the respective quantum beam, such that each single photon detection unit corresponds to a respective quantum beam and as such the respective wavelength of that quantum beam; tagging each single photon detection event resulting from each single-wavelength quantum beam according to time, and at least one of: a wavelength of photons associated with the detection event, and an identity of the detecting single photon detection unit responsible for the detection event, thereby introducing a correlation between the time at which the detection event is registered, and at least one of: the wavelength of the photons associated with the detection event, and the identity of the detecting single photon detection unit responsible for the detection event; and assigning a detection time-period to the detection event based on the correlation.

Preferably, the method includes, at the receiver: receiving a combined multi-wavelength quantum beam from a transmitter, wherein the combined multi-wavelength quantum beam comprises a series of interleaved single-photon events having different wavelengths; de-multiplexing the combined multi-wavelength quantum beam using a wavelength division demultiplexer to produce the N single-wavelength quantum beams, where each single-wavelength quantum beam has a repetition rate that is 1/N times the repetition rate of the combined multi-wavelength quantum beam; tagging each single photon detection event resulting from each single-wavelength quantum beam according to time period, wavelength of the photons, and the identity of the detecting single photon detection unit, thereby introducing a correlation between them; using this correlation to verify whether or not a single photon detection event has been tagged in the correct time period; and if a single photon detection event is found to be tagged in the incorrect time period, re-assigning the detection event to the correct time period.

In a seventh aspect, the present disclosure provides a computer-readable medium comprising code or computer instructions stored thereon, which when executed by a processor, causes the processor to perform the method according to claims any one of the fourth, fifth, or sixth aspects.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
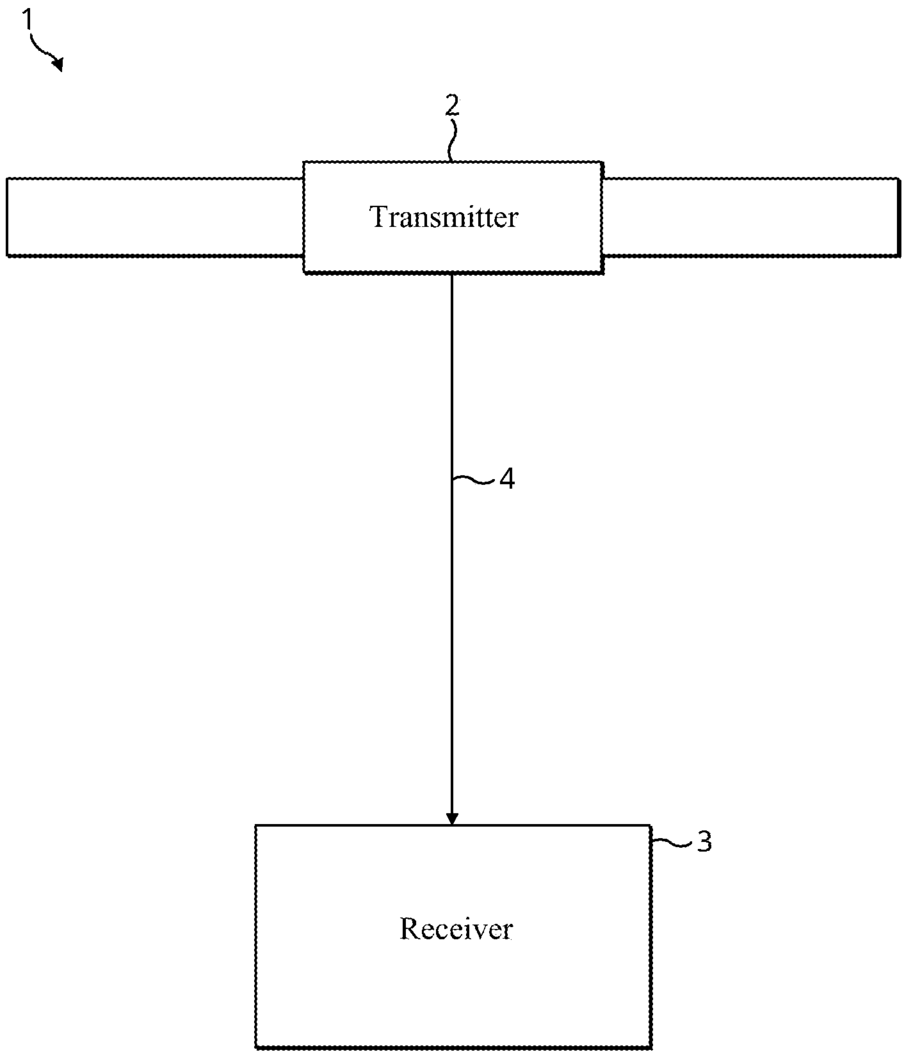
FIG. 1 is a schematic diagram illustrating a satellite quantum key distribution system according to an embodiment of the invention.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a schematic overview of a part of an optical communication system. In one embodiment, the optical communication system 1 is a Quantum Key Distribution (QKD) system.

As shown in FIG. 1, a satellite based optical communication system 1 comprises a transmitter 2 located on a satellite and a receiver 3 located on the ground. During a communication session, the transmitter 2 sends a quantum beam 4 comprising a series of single photons or weak laser pulses that are attenuated to produce single photons, down to the receiver 3 with a particular repetition rate. In the illustrated example the quantum beam 4 comprises a series of laser pulses attenuated to the single-photon level. When the receiver 3 detects the laser pulses these detection events are time-stamped by the receiver 3. The receiver 3 and the transmitter 2 then perform several post-processing steps. However, this requires the two parties (e.g. the transmitter 2 and the receiver 3) to ensure they are comparing the same corresponding bits, such that every photon ID at the receiver matches the photon ID at the satellite. The photon IDs are the temporal labels for photon transmission and detection events.

For the transmitter 2 and the receiver 3 to perform the post-processing steps to turn raw detection events into a secure key, the transmitter 2 and the receiver 3 need to be very closely synchronised. This means that the transmitter 2 and the receiver 3 must be able to match the sending event of a laser pulse at the transmitter 2 to the detection event of the same laser pulse at the receiver 3. This requires detectors of the receiver 3 to have sufficiently precise timing resolution such that they can consistently correctly measure detection events in a time-bin corresponding to the sending or emitting of laser pulses by the transmitter 2.

One of the limiting factors for achieving high repetition rate is detector timing resolution. In other words, for a communication system operating, for example, at 2 GHz the timing uncertainty between a photon impinging on the detector and that detector registering a detection event should be no more than 500 ps, so that the detection event can be matched to the correct corresponding photon emission event at the transmitter, taking into account the time of flight, or travel time, of the photon between the transmitter 2 and the receiver 3. Single photon avalanche photodiodes (SPADs) are often the detector of choice for communications systems that use photons (e.g. QKD) due to their affordability, small footprint and ability to operate at temperatures easily reachable by thermoelectric cooling (or room temperature). However, SPADs suffer from finite timing resolution/jitter, which also manifests itself in long detector response 'tails'. State-of-the-art SPADs have instrument response functions (i.e. a histogram of detection events with respect to emission events) that can extend over a relatively long period, for example, several 500 ps time-bins. This makes it difficult for the ground and satellite to correlate the sent and detected events for later post-processing.

Improving detector timing resolution is a non-trivial problem, and often comes with the penalty of reduced detection efficiency. Therefore, it is desirable to reduce the impact of finite detector timing resolution.

The present disclosure provides means to improve the effective timing resolution of the QKD system, thus allowing higher repetition rates for the optical communication system 1, without requiring significant detector advancements or utilisation of expensive and complex detector technology.

It will be understood that in practice the satellite based optical communication system 1 has many additional elements which are not shown in FIG. 1, and will not be described herein. FIG. 1 is merely an explanatory diagram to assist in explaining the requirement for increasing the repetition rate of the optical link between the transmitter 2 and the receiver 3.

In the illustrated embodiment, the transmitter 2 is a satellite and the receiver 3 is an optical ground receiver (OGR) at a ground station. However, it is to be understood that the transmitter 2 and receiver 3 may each terrestrially based, as part of a terrestrial communication system, or both may be located on satellites. Similarly, the transmitter 2 may be terrestrially based and the receiver 3 may be a satellite. In the illustrated embodiment the quantum beam 4 travels through free space between the transmitter 2 and the receiver 3. In other terrestrial examples the quantum beam may travel through optical fibre(s) between the transmitter and receiver.

An overview of the present disclosure is for the transmitter 2 to use a plurality "N" of separate quantum beams 4 having different wavelengths which are multiplexed at the transmitter 2, and subsequently de-multiplexed at the receiver 3, such that each quantum beam 4 is directed to a separate optical path for photon decoding and post-processing at the receiver 3. This introduces a correlation between the wavelength and the time period, such as a time-bin of each detection event, which correlation can used to re-assign photon detection events to the correct time period/time-bin in instances where a detection event was tagged at an incorrect time period/time-bin.

Figure 2A:
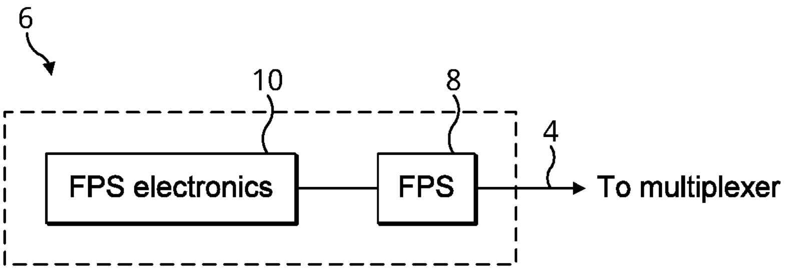
FIG. 2*a* is a schematic diagram illustrating a pulse generator for generating single photons or weak laser pulses according to an embodiment of the invention.

In FIG. 2*a* shows a plurality of faint optical pulse generators 6 (located within the transmitter 2), which each produces a series of faint laser pulses at a particular wavelength to form a single-wavelength quantum beam 4. Each faint optical pulse generator 6 comprises a faint photon source (FPS) 8 controlled by pulse electronics 10. Each FPS 8 generates faint laser pulses at a particular wavelength, which are attenuated to single photon events to form a quantum beam 4 suitable for use in, for example, QKD protocols. In some other examples, each FPS 8 may be a single photon source. In the illustrated embodiment, the optical communication system 1, which may be a QKD system, operates using the BB84 polarisation encoding protocol. However, it can be appreciated that other QKD protocols may be employed, such as those using time-bin or phase encoding.

Figure 2B:
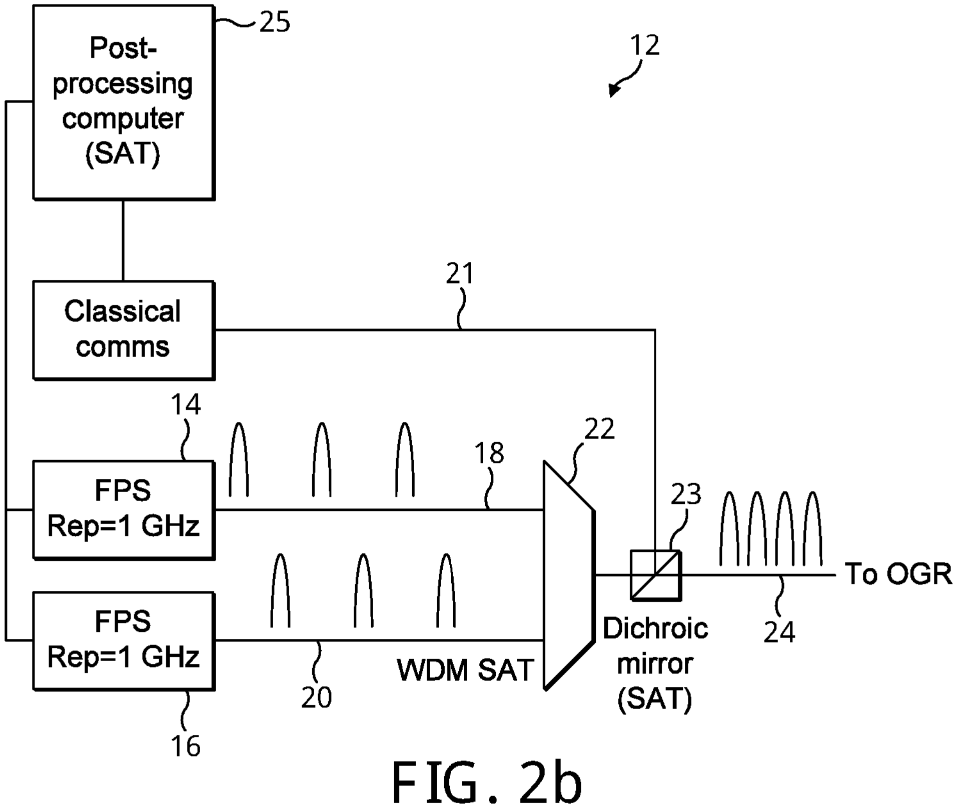
FIG. 2*b* is a schematic diagram illustrating a QKD transmitter according to an embodiment of the present invention.

FIG. 2*b* shows a schematic diagram of an optical beam generator 12 used in the transmitter 2. The optical beam generator 12 comprising two FPS 14 and 16. Each of the FPS 14 and 16 correspond to the FPS of FIG. 2*a*. The FPS 14 and 16 each produce a respective quantum beam 18, 20 at a fixed repetition rate (e.g. 1 GHZ) suitable for use in QKD protocols and a particular wavelength, with the quantum beams 18 and 20 emitted by the different FPS 14 and 16 having respective different wavelengths. The quantum beams 18, 20 are combined or multiplexed at a wavelength multiplexer (WDM) 22 to produce a combined dual frequency quantum beam signal 24, with a pulse repetition rate that is double that of the each of the quantum beams 14 and 16 (i.e. 2 GHz). The repetition rate of the combined quantum beam 24 is the desired or target repetition rate of the QKD system 1. In the illustrated embodiment, the WDM 22 is a dichroic mirror, however, it can be appreciated that other suitable optical components that are capable of combining the different frequencies of the quantum beams 18 and 20 may also be used to combine or multiplex the quantum beams 18 and 20. Additionally, a dichroic mirror 23 is located after the WDM 22, which combines the combined quantum beam 24 with a beam of a bi-directional classical communications channel 21, as shown. The classical communications channel 21 is connected to a post-processing computer 25, and includes a classical avalanche photodiode (APD, not shown) for the detection of light travelling through the channel 21. The classical communications channel 21, as well the post-processing computer 25 are used in the later post-processing stages, as will be explained later. Both FPS 14 and 16 share a common pulse electronics 10 to synchronise the pulse emission from the FPS 14 and 16 to be alternate, such that when the quantum beams 18, 20 are combined at the WDM 22, the combined quantum beam signal 24 comprises a series of pulses different in wavelength after passing through the WDM 22, that is, the combined quantum beam signal 24 comprises interleaved alternate pulses at the respective different wavelengths of the quantum beams 14 and 16. The output of the optical beam generator 12 (i.e. beam 24) is sent by the transmitter 2 to the receiver 3.

In some embodiments, the optical beam generator 12 comprises N number of FPSs 8, where N is a number greater than 1, each producing N quantum beams 4 with a different wavelength. The repetition rate of each the quantum beams 4 is (1/N)×desired repetition rate of the QKD system 1, such that the combined quantum beam 24 has the desired repetition rate of the QKD system 1. As before, all the FPSs 8 share common pulse electronics 10, such that when the quantum beams 18, 20 are combined at the WDM 22, the combined quantum beam 24 comprises a series of interleaved pulses.

Figure 3:
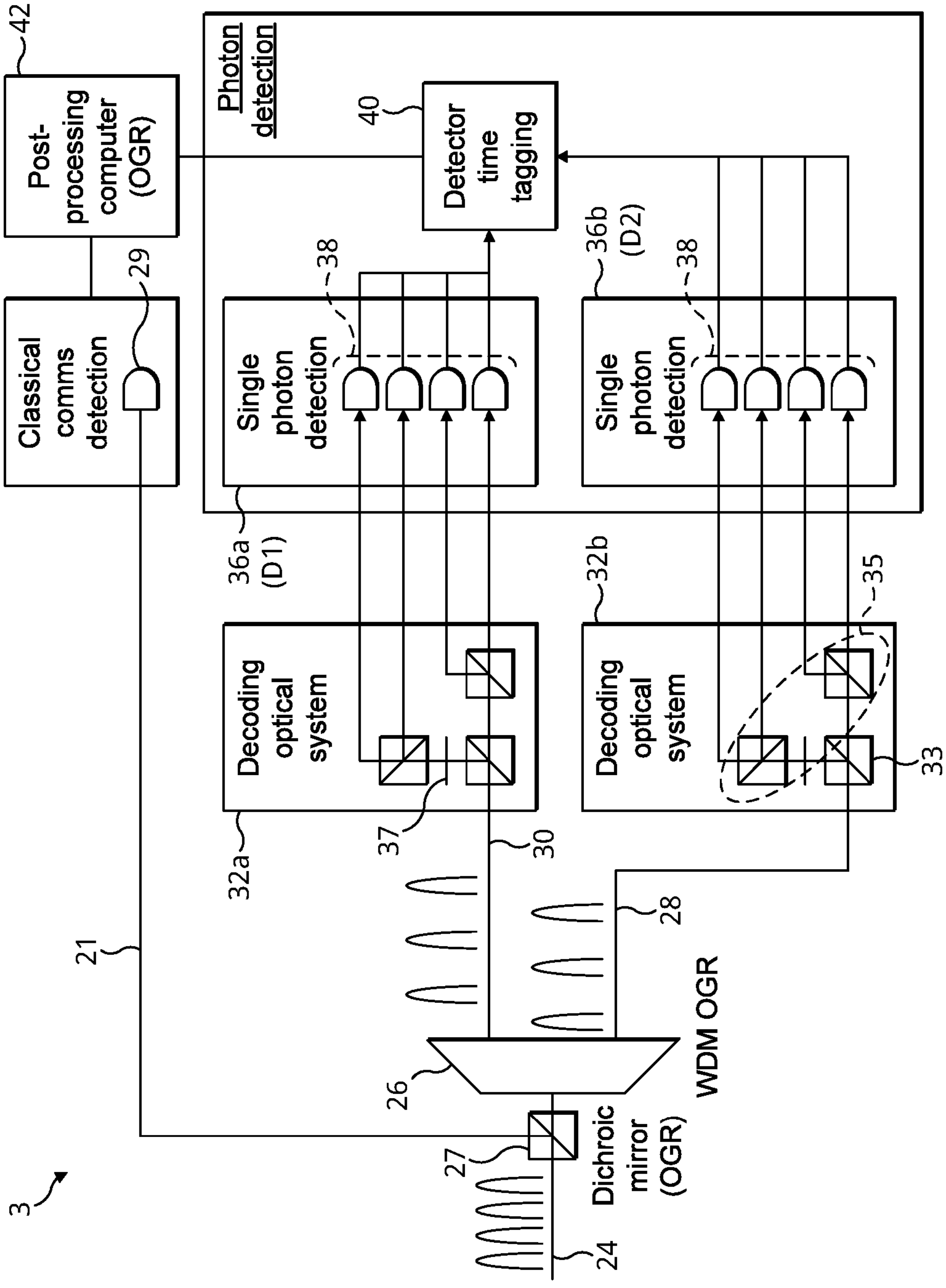
FIG. 3 is a schematic diagram illustrating a QKD receiver according to an embodiment of the present invention.

FIG. 3 shows a receiver 3 of the QKD system 1 according to the illustrated embodiment of the present invention. The receiver 3 receives the combined quantum beam signal 24 emitted from the satellite optical beam generator 12 using input optics of the receiver 3 (not shown). The receiver 3 comprises a dichromic mirror 27, which separates the combined quantum beam 24 from the classical beam of the classical communications channel 21 (e.g. operating at 1 Gbps). The classical beam is then directed towards an APD 29 for detection, which is connected to a post-processing computer 42. It should be noted that the arrangement of the classical communications channel 21 where the classical beam is coaxial with the quantum beam 24 during transmission is not essential, as other arrangements may also be used. The quantum beam 24 (now without the classical beam) is then directed towards a wavelength de-multiplexer 26, which may be a second WDM 26, which separates or de-multiplexes the combined quantum beam 24 to form two separate single wavelength quantum beams 28 and 30 having different wavelengths corresponding to the wavelengths of the quantum beams 14 and 16. As before, the WDM 26 may be a dichroic mirror, or other suitable optical component that is capable for separating the different frequencies of the combined quantum beam 24.

The wavelengths of the quantum beams must be sufficiently different to allow robust separation or de-multiplexing of the combined quantum beam 24 by the WDM 26. The exact wavelengths of the quantum beams 18 and 20 at the optical beam generator 12 may be selected as appropriate in any specific implementation.

In addition to de-multiplexing of the combined quantum beam 24 into separate single wavelength quantum beams 28 and 30, the WDM 26 also physically routes the beams 28, 30 to separate and parallel optical paths according to their wavelength, such that each quantum beam 28, 30 is routed to a separate parallel decoding optical systems 32*a*, 32*b*, as shown in FIG. 3. In the illustrated example of FIG. 3, the decoding optical systems 32*a*, 32*b* are arranged to decode the quantum beams 28, 30 according to the BB84 polarisation encoding protocol, and so the decoding optical systems 32*a*, 32*b* are polarisation analysers. In the BB84 polarisation encoding protocol, the photons assume one of four linear polarisation states: H, V, A and D. Each decoding optical system 32 and 32*b* comprises a non-polarising beamsplitter 33, two polarising beamsplitters 35 and a halfwave plate 17 arranged to provide photons which have respective ones of the four linear polarisation states: H, V, A and D as outputs to respective ones of four single photon detector units 38. The first beam splitter 33 of each decoding optical system 32 is non-polarising, and so randomly selects a measurement basis of each photon (i.e. either H/V or A/D basis). The next are two polarising beam splitters 35, which separate the photons according to their polarisation. One of the arms of each decoding optical system 32 also comprises a halfwave plate 37 between the beamsplitter 33 and one of the polarising beamsplitters 35, which rotates the plane of polarisation such that the corresponding polarising beam splitter 35 can correctly separate the photons according to their polarisation.

Each decoding optical system 32 then directs photons to respective separate single photon detection units 36*a* and 36*b*. Each single photon detection unit 36*a* and 36*b* comprises a plurality of signal photon detectors 38. In the embodiment shown FIG. 3, each single photon detection unit 36 comprises four single photons detectors 38, which is required to decode the photons according to the BB84 polarisation encoding protocol. However, it can be appreciated that in other examples different numbers of single photons detectors 38 may be used, depending on how the incoming photons are encoded. Thus, a photon comprising a first wavelength of the quantum beam 30 will be directed by the de-multiplexer 26, for example, to the first detection unit 36*a*. Similarly, a photon comprising a second wavelength, which is different from the first wavelength, of the quantum beam 28 will be directed to the second detection unit 36*b* by the de-multiplexer 26. In this manner, the wavelength of the photons is correlated to the appropriate single photon detection units 36*a* and 36*b*.

It can be appreciated that although FIG. 3 only shows two decoding optical systems 32 and two single photons detection units 38 (since the combined quantum beam 24 comprises only two wavelengths), in other examples the receiver 3 can be modified to accommodate any plural number N of decoding optical systems 32 and single photon detection units 38. This is required in the general case when the combined quantum beam 24 comprises N quantum beams 4, each with N different wavelengths.

With the configuration shown in FIG. 3, the effective timing resolution of the system 1 is halved. Some examples of explaining this are as follows. Consider a situation where only a single detection unit 36 is used (e.g. only 36*a* is used) with a single wavelength quantum beam. In this configuration, an error can be introduced into the system 1 in one of two ways. The first case is when a single photon arriving at a detector 38 does not register a click in the first time period, but instead registers a click in a subsequent, incorrect time period. In this case, it is not possible to tell whether that detection event belongs to the first time period or the subsequent time period, thus introducing an error into the system 1. The second case when two photon detection events are registered in the same time period by two separate detectors 38, as a result of the limitations of the timing resolution of the detectors 38. In this case, it would not be possible to tell which photon detection event belongs to which time period either, thus also introducing an error into the system 1. For example, if the photons are emitted are emitted at 2 GHZ (nominally every 500 ps), then if one of the detectors 38 registers a detection event, say, 700 ps after receiving a photon, and the other detector 38 registers an event within 500 ps after receiving a photon, then if the photons were consecutively emitted, both detection events may be registered in the same time period. In this case, it will be unclear which detection event corresponds to a most recently emitted photon, and which detection event corresponds to a previously emitted photon.

By using two detection units 36*a* and 36*b*, a correlation is introduced between the time of detection/registering a detection event and at least one of the wavelength of the photons, and the identity of the detecting single photon detection unit (i.e. 36*a* or 36*b*). Thus, even if two detection events are registered in the same time period but in different detection units 36, later post-processing is able to assign the detection event to the correct time period using this correlation, as will be described below. Alternatively, in systems where the detection event has already been registered in the incorrect time period, later post-processing is able to re-assign the detection event to the correct time period using this correlation, as will be described below. Which of these alternatives is followed will depend upon the manner in which registration of detection events is carried out in any specific implementation.

Furthermore, in a specific case, let us assume that the combined quantum beam 24 has a repetition rate of 2 GHz and sends an H state with a photon ID corresponding to time-bin 10. In a standard receiver with only one set of detectors 38, if the 'H' detector registers a click 600 ps after the 'H' photon arrives at the detector, it will incorrectly allocate an 'H' detection to the following bin, i.e. bin 11. By using two or more sets of detectors 38, even if two photon detection events are registered in the same time bin, later post-processing is able to assign, or re-assign, the event into the correct time bin based on the pulse wavelength, which can be determined from the identity of the receiving photon detector 38 or detection unit 36, as will be described below. This is achieved using a processing computer 42. Accordingly, by using N quantum beams in the system 1, the effective timing resolution of the system 1 is increased by a factor of N, compared to the system 1 using just a single wavelength.

The outputs of each single photon detector 38 are provided to a detector time tagger 40. The time tagger 40 time stamps the single photon reception events detected by the single photon detectors 38 using a clock signal from a receiver 3 local clock (not shown). In the embodiment shown in FIG. 3, the time tagger 40 has eight channels, each corresponding to one of eight single photon detectors 38. Each channel of the time tagger 40 also tags the detection events with the wavelength of photons and/or the detection unit 36 in which the detection is registered (i.e. 36*a* or 36*b*), and the encoding (i.e. polarisation H, V, A, D) of the photons. As is explained above, there is a fixed relationship between the wavelength of the received photons and the different detecting units 36*a* and 36*b* making the detections, so that the identity of the detection unit 36 making the detection can be regarded as identifying the wavelength. Thus, a correlation is introduced between the time of detection (i.e. time bins), wavelength and/or the detection units for each detection event, and polarisation of the photons. The output of the time tagger 40 is provided to the processing computing 42.

The processing computer 42 then uses the correlation between the time of detection (i.e. time bins) and wavelength and/or the detection unit for each detection event to assign the detection event to a time period such as a time bin. In an example, the computer 42 may verify whether or not a detection event has be tagged with the correct time-bin. Furthermore, if the computer 42 finds that a detection event is tagged with an incorrect time bin, then it is able to re-assign the detection event with the likely correct time bin.

Additionally, in the embodiment shown in FIG. 3, the receiver 3 comprises only single time tagger 40. However, receiver 3 can also accommodate multiple time taggers 40, one for each single photon detection unit 38, and in which all share the same local clock.

Subsequently, the receiver 3 communicates information regarding the correlation between the time of detection (i.e. time bins), wavelength and/or the detection units for each detection event, and polarisation of the photons to the transmitter 2 via the classical channel 21 to perform raw key agreement (establishing correspondences of transmitted and received photons) as the first stage of post processing, with the transmitter 2 using the wavelength information to select the relevant encoding. Later stages of post processing (e.g. sifting, parameter estimation, error correction, privacy amplification) can then proceed in an integrated manner, or as separate parallel chains.

Figure 4:
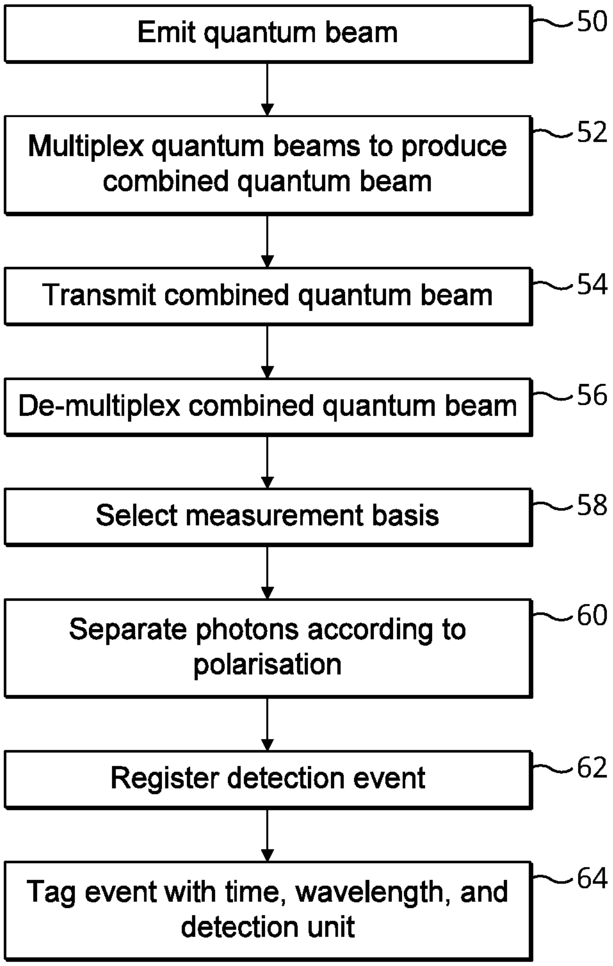
FIG. 4 is a flowchart illustrating the method implemented by the QKD system according to an embodiment of the present invention.

FIG. 4 shows a flow chart of method implemented by the QKD system 1 according to an embodiment of the present invention. At step 50, plural quantum beams are emitted at a transmitter 2, which is integrated into satellite. In an embodiment, there may be N quantum beams generated by the transmitter, each with a different wavelength, and the photons comprising the quantum beams are encoded using the BB84 protocol. The repetition rate of quantum beams is 1/N times the targeted repetition rate of the QKD system 1. At step 52, the quantum beams are multiplexed at a WDM to produce a multi-wavelength combined quantum beam with the target repetition rate.

The combined quantum beam is then transmitted 54 to a receiver 3, where the combined quantum beam is de-multiplexed 56 according to wavelength into separate single-wavelength quantum beams. Each single-wavelength quantum beam is then routed to a separate decoding optical system, where the decoding optical system randomly selects 58 a measurement basis of each photon (e.g. H/V or A/D). The photons are subsequently separated 60 according to their encoding/polarisation by two polarising beam splitters of the decoding optical system, and routed to separate single photon detectors. The single photon detectors register 62 photon detection events, and tag 64 each event with the time, wavelength and/or detection unit in which the photon event was detected.

In the embodiments described above the faint pulses are single photon events. In other examples, these may be multi-photon events.

In the embodiments described above the faint pulses are single photon events comprising a series of laser pulses attenuated to the single-photon level. In other examples, other methods of producing the faint pulses may be used.

In the embodiments described above the times are recorded as time-bins. In other examples different periods of time may be used.

In the embodiments described above the system comprises a single optical ground receiver (OGR). The system may comprise any number of OGRs.

In the embodiments described above the system comprises a single satellite. The system may comprise any number of satellites.

In the embodiments described above, each of the satellite and the OGR includes a single dichroic mirror to combine and separate the different optical beams. In other examples, different beam combining or separating arrangements may be used.

In the embodiments described above, specific laser wavelengths and pulse repetition rates are used. In other examples, different wavelengths and/or pulse repetition rates may be used.

In the embodiments described above, the different faint pulse sources (FPS) share a common pulse electronics to synchronise their pulse emissions. In other examples, the different FPSs may have separate dedicated pulse electronics.

In the embodiments described above the system is a quantum key distribution system. In other examples other cryptographic items could be distributed/delivered in addition to, or as an alternative to, encryption keys. Examples of such other cryptographic items include cryptographic tokens, cryptographic coins, or value transfers.

In the described embodiments of the invention parts of the system may be implemented as a form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although illustrated as a single system, it is to be understood that a system may be a distributed system.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of preferred embodiments is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. An optical communication system comprising:

a transmitter, wherein the transmitter comprises:

N faint photon sources, where N is greater than 1, wherein each faint photon source is configured to emit a quantum beam at a different wavelength, and wherein each quantum beam comprises a series of single photon events; and a wavelength division multiplexer for multiplexing the quantum beams to produce a combined multi-wavelength quantum beam, wherein:

the combined multi-wavelength quantum beam comprises a series of interleaved single photon events having different wavelengths, and wherein the repetition rate of the combined quantum beam is N times the repetition rate of the individual quantum beams; and a receiver arranged to receive the combined multi-wavelength quantum beam from the transmitter, wherein the receiver comprises:

a wavelength division demultiplexer for de-multiplexing the received combined multi-wavelength quantum beam to produce N quantum beams each with a different respective wavelength, wherein the repetition rate of each quantum beam is 1/N times the repetition rate of the combined multi-wavelength quantum beam, and wherein each quantum beam comprises a series of single photons;

N single photon detection units, each configured to receive a respective quantum beam of the N quantum beams and detect single photon events resulting from the respective quantum beam, such that each single photon detection unit corresponds to a respective quantum beam and as such the respective wavelength of that quantum beam;

one or more time-taggers configured to tag a detection event according to time, and at least one of: a wavelength of photons associated with the detection event, and an identity of the detecting single photon detection unit responsible for the detection event, thereby introducing a correlation between the time at which the detection event is registered, and at least one of: the wavelength of the photons associated with the detection event, and the identity of the detecting single photon detection unit responsible for the detection event; and a processing computer connected to the one or more time taggers, wherein the processing computer is configured to assign a detection time-period based on the correlation.

2. The optical communication system according to claim 1, wherein the transmitter is on a satellite.

3. The optical communication system according to claim 1, wherein the one or more time taggers are further configured to tag each detection event with the encoding of the photons.

4. The optical communication system according to claim 1, wherein the receiver further comprises N decoding optical systems, arranged in parallel, configured to select a measurement basis of the photons, and separate the photons according to their encoding, wherein each decoding optical system is configured to receive a single quantum beam of the N quantum beams.

5. The optical communication system according to claim 1, wherein the receiver comprises N time taggers, such that each single photon detection unit is connected to a separate time tagger.

6. The optical communication system according to claim 1, wherein each single photon detection unit comprises a plurality of single photons detectors arranged in parallel.

7. The optical communication system according to claim 1, wherein each photon detection unit comprises four single photons detectors arranged in parallel.

8. The optical communication system according to claim 1, wherein the receiver is a ground-based receiver.

9. The optical communication system according to claim 1, wherein the time period corresponds to a time-bin.

10. The optical communication system according to claim 1, wherein the faint photon source is a single photon source.

11. A receiver for an optical communication system, the receiver comprising:

a wavelength division demultiplexer for de-multiplexing a combined multi-wavelength quantum beam received from a transmitter to produce N quantum beams each with a different respective wavelength, wherein N is greater than 1, wherein the repetition rate of each quantum beam is 1/N times the repetition rate of the combined multi-wavelength quantum beam, and wherein each quantum beam comprises a series of single photons;

N single photon detection units, each configured to receive a respective quantum beam of the N quantum beams and detect single photon events resulting from the respective quantum beam, such that each single photon detection unit corresponds to a respective quantum beam and as such the respective wavelength of that quantum beam;

one or more time-taggers configured to tag a detection event according to time, and at least one of: a wavelength of photons associated with the detection event, and an identity of the detecting single photon detection unit responsible for the detection event, thereby introducing a correlation between the time at which the detection event is registered, and at least one of: the wavelength of the photons associated with the detection event, and the identity of the detecting single photon detection unit responsible for the detection event; and a processing computer connected to the one or more time taggers, wherein the processing computer is configured to assign a detection time-period based on the correlation.

12. The receiver according to claim 11, wherein the one or more time taggers are further configured to tag each detection event with the encoding of photons.

13. The receiver according to claim 11, wherein the receiver further comprises N decoding optical systems, arranged in parallel, configured to select a measurement basis of photons, and separate the photons according to their encoding, wherein each decoding optical system is configured to receive a single quantum beam of the N quantum beams.

14. The receiver according to claim 11, wherein the receiver comprises N time taggers, such that each single photon detection unit is connected to a separate time tagger.

15. The receiver according to claim 11, wherein each single photon detection unit comprises a plurality of single photons detectors arranged in parallel.

16. The receiver according to claim 11, wherein each photon detection unit comprises four single photons detectors arranged in parallel.

17. The receiver according to claim 11, wherein the receiver is a ground-based receiver.

18. The receiver according to claim 11, wherein the time period corresponds to a time-bin.

* * * * *